United States Patent [19]

Sentance

[11] 4,293,576

[45] Oct. 6, 1981

[54] FOOD PRODUCT AND PROCESS OF MANUFACTURE

[75] Inventor: Christopher B. Sentance, Wodonga, Australia

[73] Assignee: Effem Foods Pty. Ltd., Wodonga, Australia

[21] Appl. No.: 932,650

[22] Filed: Aug. 10, 1978

[30] Foreign Application Priority Data

Aug. 15, 1977 [AU] Australia .................... PD1233

[51] Int. Cl.$^3$ .............................................. A23K 1/04
[52] U.S. Cl. ................................ 426/104; 426/574; 426/647; 426/657; 426/805
[58] Field of Search ............ 426/647, 657, 641, 574, 426/805, 104, 264, 265, 266

[56] References Cited

U.S. PATENT DOCUMENTS

| | | | |
|---|---|---|---|
| 2,171,428 | 8/1939 | Griffith et al. | 426/657 X |
| 2,241,868 | 5/1941 | Reimann | 426/647 X |
| 3,873,736 | 3/1975 | Palmer et al. | 426/657 X |
| 3,904,775 | 9/1975 | Harwood et al. | 426/647 X |
| 3,917,876 | 11/1975 | Harwood et al. | 426/647 X |
| 3,922,352 | 11/1975 | Tewey et al. | 426/574 X |
| 3,987,213 | 10/1976 | Hawkins | 426/657 X |
| 4,070,490 | 1/1978 | Lugay et al. | 426/647 X |
| 4,143,168 | 3/1979 | Bernotavicz | 426/266 |

FOREIGN PATENT DOCUMENTS 881397 11/1961 United Kingdom ............ 426/574

OTHER PUBLICATIONS

Fruton, J. S. et al., "General Biochemistry", John Wiley & Sons, Inc., New York, 1953, pp. 612, 613, 802 & 803.

*Primary Examiner*—Robert A. Yoncoskie
*Attorney, Agent, or Firm*—Davis, Hoxie, Faithfull & Hapgood

[57] ABSTRACT

The invention relates to an improved food product for animals and a process for producing such a product. The product and process are based on whole animal blood, and/or coagulable phase(s) of such blood, which is (are) subjected to controlled stimulated coagulation.

9 Claims, No Drawings

FOOD PRODUCT AND PROCESS OF MANUFACTURE

This invention relates to the field of food products—and more specifically, within that field, to processed food for animals (particularly domestic animals such as dogs and cats), and an improved process for making such foods. By the invention, there is provided a food product having the appearance of meat, and a process whereby such product can be sufficiently and economically manufactured. The product—which (i) has a firm moist texture, plus the visual characteristics, handling characteristics and storage characteristics of cooked meat, and (ii) evidences an extremely satisfactory level of animal acceptance—is useful both as a food itself and as a supplement or additive.

Animal foods having a meaty appearance are known in the art. Generally speaking, however, prior art products have contained large proportions of non-meat materials deleterious to (meat simulating) appearance and animal acceptance—while from the manufacturing aspect, the processes for their production have necessitated the use of artificial binding systems and/or the use of equipment which, because of its lack of versatility and relative sophistication, adversely affected the overall economy of the operation. It is a principal object of the invention to provide a process and resultant product whereby the foregoing disadvantages are obviated.

In one broad aspect the invention provides a process for producing a food product wherein a single coagulable phase of animal blood, or a coagulable blend of predeterminedly proportioned animal blood phases—the said phase(s) having been separated from blood preliminarily treated to prevent natural coagulation and being optionally supplemented or substituted, partially or totally, by whole animal blood likewise preliminarily treated—is (are) subjected to a controlled stimulated coagulatory action. In a more specific aspect the invention provides a process for producing a food product which comprises the steps of establishing a single coagulable phase of animal blood or a coagulable blend of predeterminedly proportioned animal blood phases, the said phase(s) having been separated from blood preliminarily treated to prevent natural coagulation and being optionally supplemented or substituted, partially or totally, by whole animal blood likewise preliminarily treated; and introducing to the said phase(s), and/or to the whole blood partially or totally substituted therefor, at least one coagulation stimulating component. In a still further aspect, the invention provides such a process comprising the steps of (a) establishing a single coagulable phase of animal blood or a coagulable blend of predeterminedly proportioned animal blood phases, the said phase(s) having been separated from blood preliminarily treated to prevent natural coagulation and being optionally supplemented or substituted, partially or totally, by whole animal blood likewise preliminarily treated;

(b) heating the said optionally supplemented or substituted phase(s) to a temperature in the vicinity of the physiological temperature of the animal from which the blood was derived;

(c) incorporating at least one agent to prevent the exuding of serum or other fluids, and, optionally, at least one additional additive selected from colour enhancers and/or modifiers, flavour enhancers, and texture-modifying agents;

(d) adding to the thus treated optionally supplemented or substituted phase(s), at said temperature, at least one coagulation stimulating component; and (as required)

(e) cooking the coagulated product to produce a material having the appearance of cooked meat.

The invention also includes within its ambit a related food product both per se, and as produced in accordance with any of the foregoing processes. In the broadest of these aspects, the product comprises blood (as herein defined) coagulated by at least one coagulation stimulating component and optionallly incorporating at least one agent to prevent the exuding of serum or other fluids, colour enhancers and/or modifiers, flavour enhancers, and texture-modifying ingredients.

In the immediately foregoing definition, the expression "blood" is to be defined as denoting a single coagulable phase of animal blood, a coagulable blend of predeterminedly proportioned animal blood phases, whole blood or a mixture of whole blood and one or more phases of animal blood, the said whole blood, and the blood from which said phases are separated, having been preliminarily treated to prevent coagulation.

Still further aspects of the invention will be revealed in the ensuing description.

Compared with the prior art, the present invention offers several positive advantages. Firstly, the product—which is stable to mechanical handling unlike the syneresis-prone product of uncontrolled natural coagulation—has been found to be extremely realistic in its stimulation of authentic meat, the animal blood/blood phase(s), proportioned as required, contributing to this authenticity. Technique-wise, the process—with the steps of anti-coagulation followed by positively stimulated coagulation providing the control which is characteristically absent from the natural coagulatory process (as indicated above)—is both readily amenable to such control and capable of performance with simple, readily available and inexpensive equipment and raw materials. Further, as an indication of its utility and versatility, such process alleviates the need for added binders whilst being capable of performance either batch wise or continuously.

The invention will now be described in greater detail with sequential reference to (i) preferred details, and (ii) specific examples. As a prelude thereto, it is emphasised that such ensuing description is merely intended to illustrate the invention, and hence should not be limitatively construed. Where percentage figures are indicated, the percentages are by weight.

The blood and/or blood phases used in the invention may be from any generic animal source, with the blood being preliminarily treated (as indicated heretofore) to prevent natural coagulation. Whilst ox blood is preferred due to ease of collection and handling (with a coagulation-commencing time of the order of 15 seconds, an operator is afforded a reasonable period to implement requisite anti-coagulatory action), blood from any other animal sources which will permit anti-coagulation measures (e.g. pigs, sheep) may be utilised. Coagulation may be prevented in conventional fashion, a preferred method being the addition of salts or acids containing the citrate ion (e.g. sodium citrate) at a level of (e.g.) about 0.2% to 1.0%.

The preferred phases of animal blood used in the invention are those commonly known as plasma and haemoglobin (haemoglobin however, is not employed alone). Such phases are preferably obtained by continuous centrifugal separation—although the method of separation (like the technique of coagulation prevention) is not critical. As indicated heretofore, whole animal blood may be used to partially or totally replace one, or other, or both, of the above-mentioned phases.

When the said animal blood phases are recombined (blended) to give the desired colouration in the product, preferred proportions, to give a high-level simulation of authentic meat, are 0–40% haemoglobin and 60–100% plasma—with 0–15% of the former and 85–100% of the latter being especially preferred proportions within the previously specified range. If desired, a white product, simulating chicken or fish, can be produced from the plasma phase only, bleaching agents and/or pigments (such as those indicated herebelow) being desirably incorporated. Where whole animal blood is employed as a partial or total substitute for the phase(s) (as indicated above) preferred percentage ranges are whole blood/haemoglogin 80–100/20–0: whole blood/plasma 0–100/100–0. Naturally, appropriately proportioned composites of whole blood/haemoglobin/plasma can also be utilised.

The prevention of exuding of serum or other fluids—which exudation always occurs as a consequence of coagulation, and thus will inevitably occur in the coagulation reaction stimulated in accordance with the present invention—is desirably achieved by the addition of at least one gum and/or thickener, the viscosity increasing properties and water binding properties of which assist the retention of fluids in the coagulated product (and thereby enhance the acceptability of the cooked end product). Preferred exudation-inhibiting agents include high viscosity water binding gums of vegetable or microbial origin, as further (and specifically) exemplified by guar gums and xanthum gums. Proportion-wise, a preferred range for this component is of the order of 0.2–1.5% (based, as are the other percentages, on the weight of blood and/or blood phase(s)).

In elaboration with respect to the possible additional additive(s), as foreshadowed hereinabove, colour enhancers and modifiers or stabilizers, and dyestuffs or other colouring materials may be introduced to produce the colouration desired. As specific examples, there may be mentioned nitrites (e.g. sodium nitrite), bleaching agents, and pigments of animal vegetable, or mineral origin (e.g. erythrozine, titanium dioxide)—whilst range-wise, nitrite (e.g. sodium nitrite) to 0.02%, and pigments and/or dyestuffs (e.g. titanium dioxide) to 1.0% (e.g. to 0.05–0.1%) are satisfactory. A typically suitable bleaching agent is sodium hypochlorite (e.g. to 5%). As texture-modifying ingredients, there are instanced fibrous or other materials, such as meat or cereal fibers or particles (e.g. to 25%), for possible incorporation in the coagulum. Finally flavour enhancers such as salt at levels of 0–10%, natural and synthetic flavours and/or flavour boosters at similar levels, may be incorporated to increase the animal acceptance of the product.

In accordance with this invention, the coagulation action, which follows the preliminary coagulation prevention, is stimulated by the addition of at least one stimulating component as typically exemplified by salt(s) of monobasic, dibasic or tribasic cation(s), or a mixture of same. A preferred coagulation stimulant is a salt of dibasic cationic origin, typically calcium, the anionic component being in turn typically exemplified by chloride, nitrate, or hydroxide (or any other anion capable of giving a soluble salt with the selected typical cation). A preferred range of coagulation stimulant is of the order of 0.2–1%, the figure being dependent on the level of anti-coagulant employed earlier in the process, and the desired rate of coagulation. A particularly suitable coagulation stimulant is calcium chloride.

Elaborating with respect to process details, the product (be it intended for use as a food itself or as an intermediate or supplement) is produced by stimulated coagulation of the foregoing blood, and/or phase(s) thereof, under controlled conditions simulating the natural physiological conditions of animal blood. The entirely variable (non critical) order of incorporation of the above-listed possible additives, prior to the stimulation of coagulation, is illustrated as follows:

The animal blood phases—separated from blood which has been subjected to preliminary anti-coagulation as indicated—are recombined in the proportions chosen (to provide the colour desired), and selected colour and/or flavour enhancers and texture modifiers are incorporated. The resultant mix is heated to a temperature in the vicinity of (typically within 10° C. of) the physiological temperature of the animal from which the blood was derived (this temperature is 38.9° C. in the case of ox blood), a specific preferred temperature being within 5° C. of such physiological temperature. The thickener or gum is added at this temperature and mixed well—following which, the coagulation stimulant is incorporated and the mix is allowed to coagulate, preferably for up to 20 minutes (e.g. for 10 minutes) at said temperature under conditions of minimal agitation. The resultant coagulate can be chopped or minced to the desired size.

Cooking of the thus-prepared coagulate can be carried out by (e.g.) radiant heating, hot air convection heating, or water or steam blanching, the final product having the texture and other characteristics as specified heretofore. If intended for use as an intermediate or additive, the product can be simply incorporated in a mix with other selected food materials and cooked therewith.

Apparatus-wise, the invention can (as indicated heretofore) be carried out with equipment conventional to the foregoing mixing et al steps. By way of specific example, the mentioned minimal agitation may be produced per medium of low speed augers (with suitable residence time) or in pipes of appropriate length (with suitable residence time) or, more simply, in batch moulds. Other conventional equipment employable in the invention includes pumps, mixers, centrifugal separators, mincers and cookers.

The invention will now be further described with reference to the following specific numerical examples. In these examples the parts are again by weight.

EXAMPLE 1

The following formulation was mixed in a jacketed vessel with a low speed stirrer and heated to a temperature of 37° C. The blood phases were obtained by centrifugal separation of ox blood containing 0.5% sodium citrate as anti-coagulant.

Ox plasma: 90.0
Ox haemoglobin: 10.0
Sodium nitrite: 0.002

0.5 parts xantham gum were added to the mix by recirculating through a venturi mixer until well dissolved. Thereupon 0.5 parts of calcium chloride were added, and the resultant mix was held in a state of minimal agitation for 10 minutes. During this time, coagulation occurred.

The resulting coagulate was minced to a coarse mince and cooked by incorporation in a meat mix for a cooked animal food.

EXAMPLE 2

The following formation was mixed in a vessel with a low speed mixer and heated to 37° C. by steam injection. The blood phases were derived as in Example 1.

Ox plasma: 85.0
Ox haemoglobin: 8.5
Sodium nitrite: 0.002
Sodium chloride: 4.0
Supplementary flavour enhancer (artificial beef flavouring): 2.5

1.0 parts of guar gum were added to the mix using a high speed agitator. Thereupon 0.5 parts of calcium chloride were added, and the resultant mix was held in a state of minimal agitation for 10 minutes. During this time, coagulation occurred.

The resulting coagulate was cut into strips and cooked in a hot air convection oven.

In closing, it is again emphasised that, in the main, the foregoing description is merely intended to illustrate the invention. For example, although the invention is intended to produce a meat analogue of almost entirely blood origin, the process can be used as the basis for a binding system of a more conventional analogue containing proteinaceous and carbohydrate materials of animal and vegetable origin. As long as the basic criteria, as broadly defined, are observed, any matters falling therewithin, not being critical in themselves, may be varied as required.

I claim:

1. A process for producing a food product simulating meat from an anticoagulant-treated, coagulable blood fluid by the controlled, chemically-stimulated coagulation of said blood fluid under controlled temperature conditions, said process comprising the steps of:

(a) coagulating an anticoagulant-treated, coagulable blood fluid selected from the group consisting of
  (i) whole animal blood,
  (ii) a plasma phase of animal blood,
  (iii) a mixture of up to about 40% of a haemoglobin phase of animal blood and a plasma phase of animal blood,
  (iv) a mixture of whole animal blood and a plasma phase of animal blood,
  (v) a mixture of whole animal blood and up to about 20% of a haemoglobin phase of animal blood and
  (vi) a mixture of whole animal blood, a plasma phase of animal blood and up to about 40% of a haemoglobin phase of animal blood, in the presence of an exudation-inhibiting agent and a coagulation stimulant, both present in effective amounts, while maintaining said blood fluid at a temperature within about 10° C. either above or below the physiological temperature of the animal from which the blood has been derived to chemically induce coagulation and (b) then recovering the resultant coagulate.

2. A process as claimed in claim 1 wherein the animal blood is ox blood.

3. A process as claimed in claim 1 comprising the additional step of cooking the coagulated product to produce a material having the appearance of cooked meat.

4. A food product made by the process of claim 1.

5. A food product made by the process of claim 2.

7. A food product made by the process of claim 6.

8. A process as claimed in claim 1 wherein said coagulation stimulant is a soluble salt of a cation selected from the group consisting of monobasic, dibasic, or tribasic cations and mixtures thereof.

9. A process as claimed in claim 1 wherein the exudation-inhibiting agent is selected from the group consisting of guar gum and xanthum gum.

6. A process as claimed in claim 1 wherein the coagulation stimulant is calcium chloride.

* * * * *

UNITED STATES PATENT AND TRADEMARK OFFICE
CERTIFICATE OF CORRECTION

PATENT NO. : 4293576
DATED : October 6, 1981
INVENTOR(S) : Christopher B. Sentance It is certified that error appears in the above-identified patent and that said Letters Patent are hereby corrected as shown below:

Column 1, line 11, "sufficiently" should be --efficiently--;

Column 2, line 31, "stimulation" should be --simulation--;

Column 5, line 7, "formation" should be --formulation--.

Claim 6 should appear following claim 5.

Signed and Sealed this

Nineteenth Day of October 1982

[SEAL]

Attest:

GERALD J. MOSSINGHOFF

Attesting Officer

Commissioner of Patents and Trademarks